July 27, 1948. B. D. BEDFORD 2,445,991
ELECTRIC CONTROL SYSTEM
Original Filed June 12, 1944 2 Sheets-Sheet 1

Inventor:
Burnice D. Bedford,
by Prowell S. Mack
His Attorney.

July 27, 1948.　　　　B. D. BEDFORD　　　　2,445,991
ELECTRIC CONTROL SYSTEM

Original Filed June 12, 1944　　　　2 Sheets-Sheet 2

Inventor:
Burnice D. Bedford,
by *Crowell & Mack*
His Attorney.

Patented July 27, 1948

2,445,991

UNITED STATES PATENT OFFICE 2,445,991

ELECTRIC CONTROL SYSTEM

Burnice D. Bedford, Scotia, N. Y., assignor to General Electric Company, a corporation of New York Original application June 12, 1944, Serial No. 539,942. Divided and this application March 5, 1946, Serial No. 652,169

4 Claims. (Cl. 322—92)

My invention relates to an electric control system and more particularly to an electric control system for dynamo-electric machines.

This application is a division of my application Serial No. 539,942, filed June 12, 1944, entitled "Electronic converter," now Patent No. 2,435,187 of February 3, 1948, and assigned to the assignee of the present application.

In order to illustrate my invention, I will describe it as applied to a phase control system in an electronic converter system of the dual conversion type wherein alternating current is rectified by an electronic converter to direct current and then reconverted by a second electronic converter from direct current to alternating current. Since electronic converter apparatus of the dual conversion type involves both rectification and inversion, accurate firing of each tube of the inverter is essential and in a reversible power flow type, as herein described, either group of tubes at the respective ends of the system may have to operate as an inverter. Hence, such a system requires a flexible, accurate and quickly responsive phase control system without undue complications. The particular phase control system illustrated utilizes a readily controllable and reversible direct current source of voltage and in accordance with my present invention, I provide a new and improved control system for a dynamo-electric machine which is particularly well adapted for use in the phase control system illustrated but which may have general application in various other applications as will be evident to those skilled in the art.

It is, therefore, an object of my invention to provide a new and improved electric control system for a dynamo-electric machine.

It is another object of my invention to provide a new and improved electric control system for a dynamo-electric machine utilized in an electronic power conversion system.

It is a further object of my invention to provide a new and improved electric control system for an amplidyne generator.

My invention will be better understood from the following description taken in connection with the accompanying drawings, and its scope will be pointed out in the appended claims.

Figure 1:
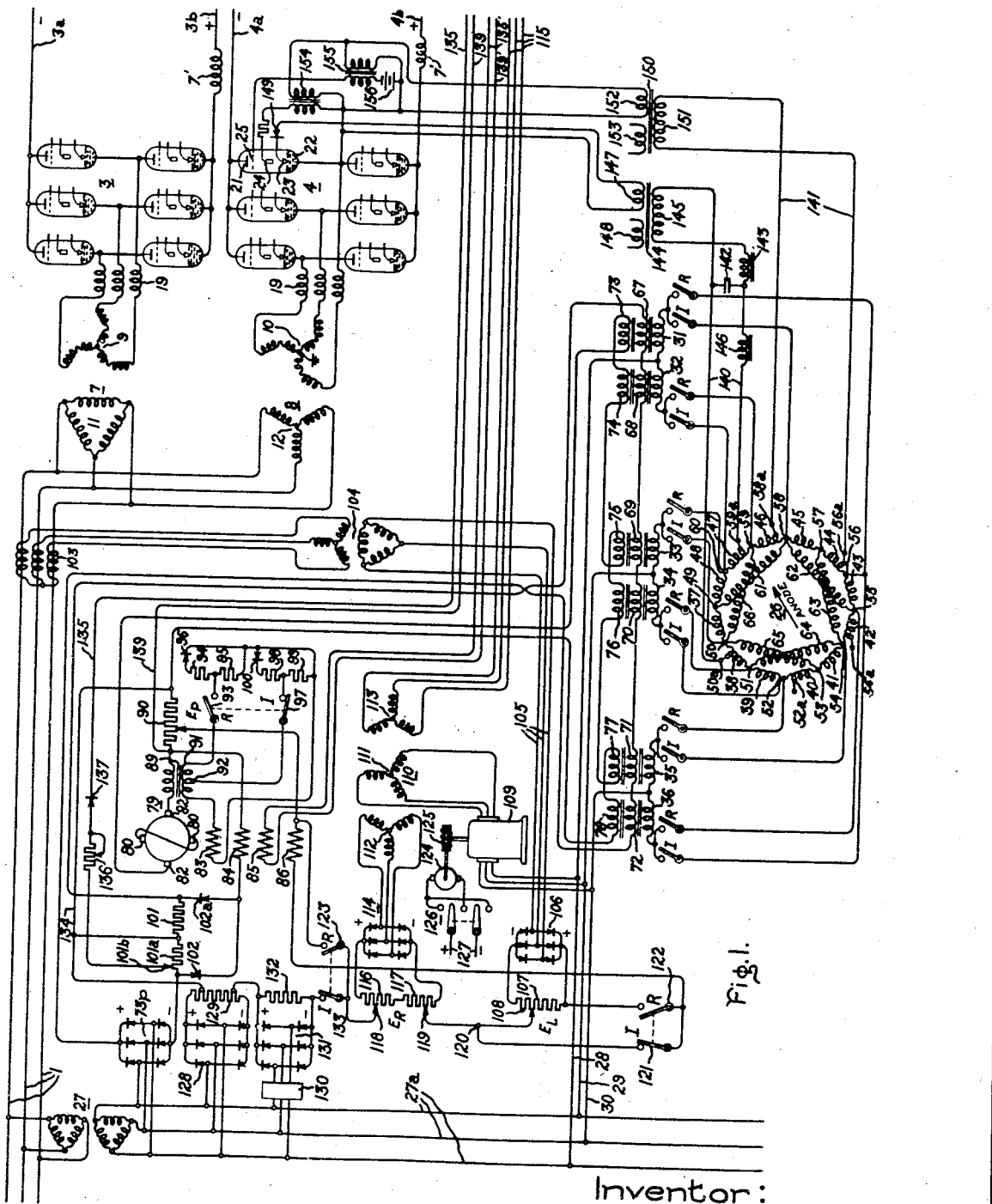
Figure 2:
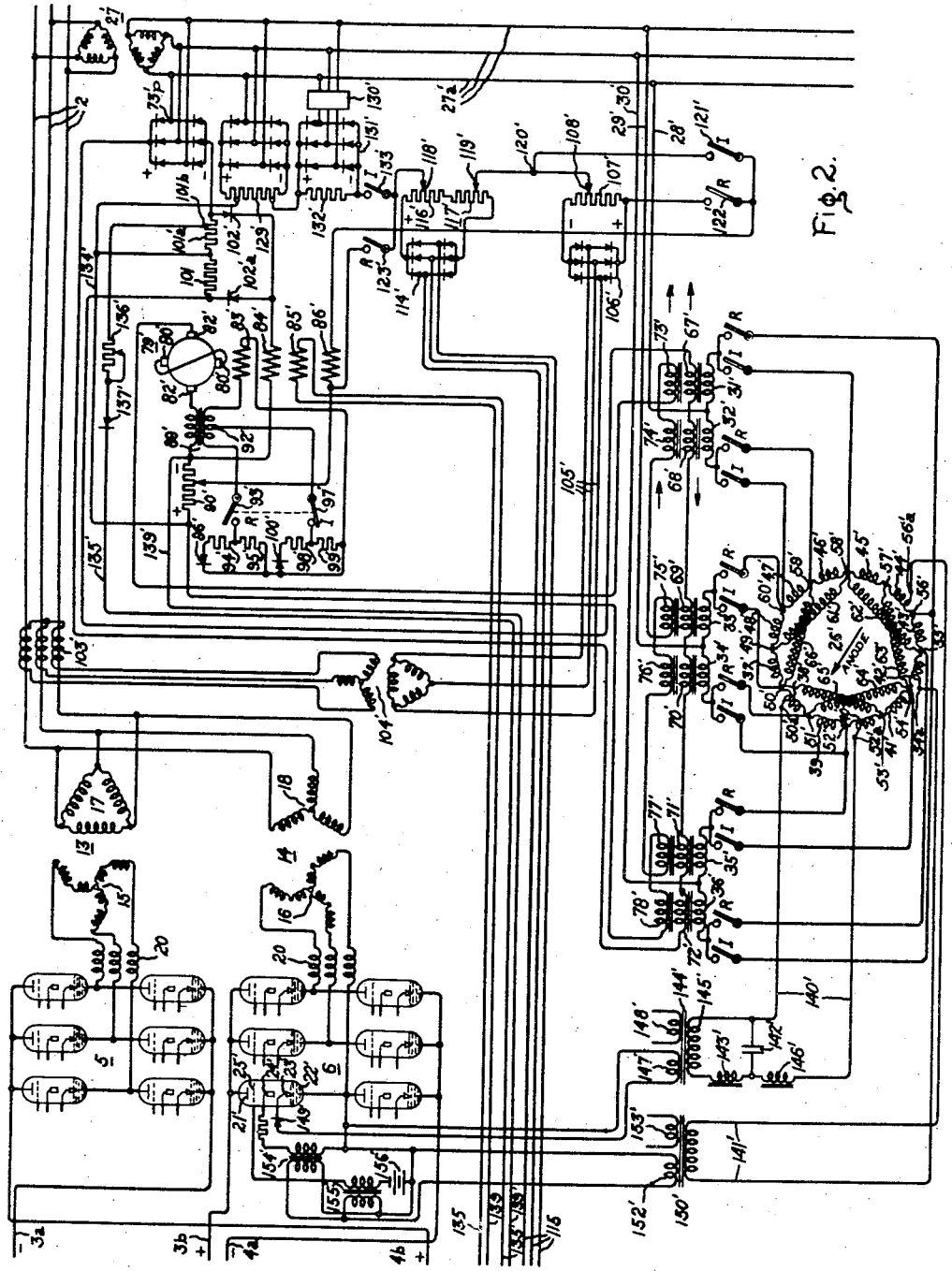

In the drawings, Figs. 1 and 2, taken together, are a diagrammatic representation of one embodiment of my invention as utilized in a complete dual conversion electronic system, whereas Fig. 1 or Fig. 2, considered separately, is a diagrammatic representation of an embodiment of my invention as utilized in a single step electronic conversion system.

Referring to the drawings, and for the present to Figs. 1 and 2 considered together, I have shown an alternating current circuit 1 which is to be interconnected with an alternating current circuit 2. I will consider first the power circuits and to facilitate the description will refer, by way of example, to circuit 1 as a 60 cycle power circuit and the tube groups associated therewith as rectifiers, and the circuit 2 as a 25 cycle power circuit and the tube groups associated therewith as inverters. It is to be understood, however, that the power circuits may be of any desired power frequency of the same or of different frequencies, and that the tube groups associated with either power circuit may be operated as rectifiers or inverters. Under the assumed conditions of function, I have illustrated in Fig. 1 two tube groups 3 and 4 of six tubes each, arranged for three phase full wave rectification, and with tubes which are 180 degrees apart in phase position mounted back to back with the cathode of one tube connected to the anode of another. In Fig. 2, I have illustrated two tube groups 5 and 6 of six tubes each, similarly arranged for three phase full wave inversion. The tube groups 3, 4, 5 and 6 are connected alternately in series in a direct current loop comprising conductors 3a, 3b, 4a and 4b which include direct current reactors 7' connected in series between each rectifier and inverter. The alternate arrangement of the 25 and 60 cycle tube groups in the direct current loop minimizes the voltage level and is a feature described and claimed in an application of A. Schmidt, Serial No. 539,939, filed June 12, 1944, now Patent No. 2,419,464 of April 22, 1947, and assigned to the assignee of the present application.

The rectifier tube groups 3 and 4 are connected to the alternating current circuit 1 through transformers 7 and 8 which are designed and connected to obtain multi-phase operation. One arrangement which has been found to be satisfactory in service is to utilize two three-phase secondary windings 9 and 10, displaced from each other thirty degrees, which may be obtained by connecting a primary winding 11 associated with secondary winding 9 in delta connection and a primary winding 12 in Y connection associated with secondary winding 10. The inverter type groups 5 and 6 are similarly connected to the alternating current circuit 2 through transformers 13 and 14 having, respectively, Y-connected secondary windings 15 and 16 and delta and Y- connected primary windings 17 and 18. Between each group of transformer secondary windings and its associated tube group current limiting reactors 19 and 20 are introduced to limit the fault currents during arc-backs or a short circuit on the direct current loop.

The three-phase double-way (full wave) circuit illustrated is particularly desirable because of its high apparatus economy and good operating characteristics. Although various types of tubes may be used, I have found in practice that of the presently available commercial forms a type known in the art as a pentode ignitron is satisfactory for large power commercial use. For the details of this type of tube, reference may be had to U. S. Letters Patent No. 2,209,819 granted July 30, 1940, upon an application of K. H. Kingdon and assigned to the assignee of the present invention. For the purpose of explaining my invention as utilized in the converter system illustrated, it will suffice to refer to one of the pair of tubes of tube group 4 which is to be taken as representative of all of the other tubes. Each tube comprises an anode 21, a mercury pool type cathode 22, an immersion-ignitor member 23, a holding anode 24 and a control member or grid 25. The immersion-ignitor 23 establishes a cathode spot by conducting a current peak of short duration whereupon an arc is established and maintained by the holding anode 24. The grid 25 is utilized to determine the time of starting conduction between anode and cathode and also reduces the deionization period at the end of conduction.

Power for both the grid and ignition circuits of the assumed 60 cycle end is obtained from an auxiliary power transformer 27 which is utilized to energize an auxiliary power bus 27a. The transformer 27 may be connected to the power circuit 1 as illustrated, or to a supply source correlated in frequency and in phase with the power circuit 1. Thus, three phase power is delivered by the bus 27a to lines 28, 29 and 30, which in turn are connected through variable impedance devices such as saturable reactors 31, 32; 33, 34 and 35, 36 to switching means R and I which may take the form of two six pole contactors wherein R signifies the rectifier contactor and I signifies the inverter contactor. These contactors introduce the grid phase shift necessary for reversing power flow which will be explained in detail later. Suitable interlocks (not shown) will, of course, be utilized to prevent simultaneous closing of the R and I contactors. These contactors connect the three-phase A.-C. lines 28, 29 and 30 to the twelve phase network 26. This network comprises a plurality of inductive windings arranged diagrammatically in the form of a polygon and for the illustrated embodiment of my invention comprises a twelve-sided polygon consisting of windings identified in a counterclockwise order from the twelve o'clock position as windings 37 to 48, inclusive. The junction points of the windings starting with the twelve o'clock position are identified in a counterclockwise direction by the points 49 to 60, inclusive. Stabilizing windings 61 to 66 interconnect, respectively, the junction points 49 to 58, 58 to 55, 57 to 54, 54 to 51, 53 to 50 and 50 to 59. Each of the several groups of windings in parallel physical relation considered diagrammatically, such as the triplet of windings 48, 66 and 42, would be placed on the same magnetic core (not shown). Each of the peripheral windings 37 to 48, inclusive, may be provided with taps for correction of the respective excitation circuits but to avoid undue complexity in the drawings only those taps required for the excitation circuits illustrated will be referred to later.

The reactors 31 to 36 are direct current saturated reactors. In accordance with the illustrated embodiment of my invention one group of flux bias windings or presaturating windings 67 to 72 are connected in series relation each with the same polarity in additive relation and energized from any convenient, relatively constant, D.-C. source which, as illustrated, may be obtained from the bus 27a through a full wave rectifier 73p. The windings 67 to 72 are associated with the A.-C. reactor windings 31 to 36 in the same order as the numerals have been specified and the current direction assumed is indicated by the arrows associated with windings 67 to 72. A group of control saturating windings 73 to 78 are connected in series relation but with the odd numbered windings of this series reversed in polarity relative to the even numbered windings. Due to the reversal of the odd numbered control reactors relative to the even, in combination with the presaturated windings, a variation in direct current through the control saturating windings affects the odd and even numbered reactors oppositely. Thus an increase in the control saturating current increases the saturation of, say, the odd numbered reactors by aiding the presaturating winding and decreases the saturation of the even numbered reactors by opposing the presaturating winding, whereas a decrease in saturating current causes the reverse effect. Phase advance on the 12-phase polygon 26 is considered to be effected in the conventional counterclockwise direction when the odd numbered reactors are being saturated while the even numbered reactors are being unsaturated. It is thus possible to shift the grids through the available range of 90 degrees by reversing the current in the control saturating windings although in the particular arrangement utilized a shift substantially 80 degrees may be effected without current reversal. For each value of saturating current there is a corresponding phase position of the network 26. Shifting the effective point of entry of the supply conductors 28, 29 and 30 to the 12-phase network by D.-C. saturation shifts the operating phase of the two 6-tube groups 3 and 4 without disturbing their 12-phase relation, and without disturbing the timing of the ignitors, grids and holding anodes for any tube. These control saturating windings 73 to 78 are connected to be variably energized from a controllable source of direct current such as a controllable dynamoelectric machine provided with an electric control system in accordance with my present invention.

It will be apparent from the foregoing description of the illustrated embodiment of my invention that for each pair of impedances or saturable reactors the same effect is produced if the bias or presaturating windings are arranged in opposed relation and the control windings in additive relation. The principal of control is dependent upon effecting an inverse change in the respective impedances of each pair of impedances with a single varying current whether the current in the control winding is in one direction or the other.

If it be assumed that the R contactor is closed (all R switches closed) each of the A.-C. lines 28, 29 and 30 will be connected through the D.-C. saturated reactors to two points on the twelve-phase network 26. Thus line 28 is connected through reactor 33 to junction point 50 in the network and is also connected through reactor 34 to junction point 51. Points 50 and 51 are separated by ninety electrical degrees on this network. In a similar manner, line 29 is connected to points 56 and 59 through reactors 31 and 32, and line 30 is connected to points 52 and 55 through reactors 35 and 36. If the odd numbered reactors 31, 33 and 35 are fully saturated and the even numbered reactors 32, 34 and 36 are unsaturated, lines 28, 29 and 30 are closely connected to the points 56, 59 and 52. This condition is taken to represent a fully advanced position. Reversing the saturation of the reactors, so that the odd numbered reactors are unsaturated and the even numbered reactors are fully saturated, in effect shifts the points of entry of lines 28, 29 and 30 ninety degrees to points 59, 51 and 55, respectively. This shift in phase of the effective points of entry in a counterclockwise direction around the network results, in effect, to rotating the network in a clockwise direction and is considered, according to convention, to represent a retardation in phase to the fully retarded position. It is, therefore, evident that the 12-phase network 26 with the R contactor closed can be given a 90-degree phase shift by reversing the saturation of the direct current reactors. When the I contactor is closed (all I switches closed) and the R switches opened, the saturating reactor spans an angle of only about 60 degrees and the grids may be advanced continuously through an angle of the order of 60 degrees beginning at a predetermined angle of advance of the grid voltage for inverter operation. This shift in phase for either rectifier or inverter is fairly continuous upon variations in the saturating current in accordance with the principles recited above. The voltage variation of the network 26 need not exceed 10% over a phase shift of 90 degrees, and it has been found that the time required for a complete phase shift of 90 degrees need not exceed 0.1 second for a 60 cycle network. All tube control power for the grids, ignitors and holding anodes for the 60 cycle tube groups 3 and 4 is furnished by the single network 26.

In accordance with my present invention, the variable direct current energization for the control saturating windings of the phase-shift network 26 is obtained from a readily controllable and reversible direct current source of voltage, which is illustrated as a direct current dynamoelectric machine 79. Although various known types of direct current dynamo-electric machines may be utilized to carry out my invention in its general aspects, I have found in practice that a particularly suitable type is the compensated cross-armature reaction excited machine known in the art as an amplidyne generator such as is described and claimed in United States Letters Patent No. 2,227,992, granted January 7, 1941, upon an application of E. F. W. Alexanderson and M. A. Edwards and assigned to the assignee of the present application. The machine 79 is, therefore, illustrated with a pair of short circuit brushes 80 for providing the main armature reaction excitation of the machine and a pair of load brushes 82 which are displaced from the short circuit brushes 80. The machine is also provided with a number of control field windings which may be identified by their respective functions as the anti-hunt winding 83, current limit field 84, load transfer field 85 and main control field 86. To facilitate an explanation of the operation of the system, it will be assumed that a positive field terminal to the right, that is, with current flow from right to left (Fig. 1) results in a positive terminal of the left-hand brush 82 of generator 79. This convention is just the opposite in Fig. 2 since that drawing, in so far as the corresponding dynamo-electric machine is concerned, is in effect a mirror image of Fig. 1. The left-hand load circuit brush 82 is connected directly to the terminal winding 73 of the series of saturable reactor control windings 73 to 78. The right-hand load circuit brush 82 is connected through an inductive coupling device 89 and a resistor 90 to the terminal winding of the winding 78 of the saturable reactor control windings.

The anti-hunt circuit of field winding 83 will now be considered. The inductive coupling device 89 is provided with a secondary winding 91 having two end terminals and an intermediate terminal 92. One end terminal of winding 91 is connected directly to one terminal of the anti-hunt winding 83 and the other end terminal is connected through an R switch 93 to the midpoint of two series connected resistors 94 and 95. These resistors, in turn, have a circuit in shunt thereto and including a contact rectifier 96 poled to pass current in the direction indicated by the arrow. In a similar manner, the intermediate tap 92 is connected through an I switch 97 to the midpoint of two resistors 98 and 99. These resistors, in turn, are provided with a shunt circuit including a contact rectifier 100 poled in a direction to pass current in the direction indicated by the arrow. The R and I switches here, as well as in all other cases in the drawing, are interlocked so that when the R switches are closed the I switches are open and vice versa. The anti-hunt circuit may be better understood by considering the R switch 93 closed and the I switch 97 open. In this case it will be observed that the circuit of field winding 83 may be traced from the right-hand terminal of the winding 91, considered as a source of positive voltage if the current increases for the polarity of the generator indicated, through the R switch 93 with one path through resistor 95 and another parallel branch path through resistor 94 and rectifier 96, to the left-hand terminal of winding 83 with current through the winding from left to right. Thus the winding 91 picks up a transient voltage as the armature current increases. This voltage is in a direction to energize the anti-hunt field 83 in a direction to make the left-hand brush less positive and thus oppose the change in armature current. If the change is in one direction the current has the two paths traced above and due to the relatively low impedance as contrasted with the one path the anti-hunt effect is the greatest. However, if the change of current is in the opposite direction or a decrease only the single path through resistor 95 is available and due to the relatively higher impedance the anti-hunt effect is less. The arrangement, therefore, provides adjustments for obtaining different anti-hunting effects, depending upon the direction of change. The same operation is effected with the I switch 97 closed and the R switch 93 opened through the resistors 98 and 99 and the rectifier 100. In this case only a portion of the winding 91 of the inductive device need be used.

The energization and control of the current limit field 84 may now be considered. One important feature of the control limit field 84 is ultimately to control the direct current flux of the saturable reactor in which the presaturating current and control current are in opposition. If the control generator were to keep on increasing its armature current beyond the value of control current or ampere turns at which the control current effect was greater than the bias or presaturating current effect, the maximum impedance of the desaturated reactor would be passed and the impedance thereafter decreased so that the phase shift would then start to change in the opposite direction. In order to accomplish this control, I provide a reference voltage which is proportional to the maximum impedance condition of the desaturated reactor which may be a component of voltage proportional to the presaturating current or bias magnetomotive force and combine this component of voltage with a component of voltage proportional to the control current of the saturable reactors. In the circuit illustrated the reference component of voltage for one direction of armature current is derived from a resistor 101 connected in series relation with the output circuit of the rectifier 73p which is a substantially constant voltage output derived from the circuit of the presaturating windings 67—72. For the reverse direction of armature current the reference component of voltage is derived from a resistor 101a connected in series with resistor 101. It will, of course, be understood that any other constant reference voltage may be used without departing from my invention in its broader aspects if such component of voltage bears the above described relation to the maximum impedance condition to the desaturated reactor. The variable component of voltage proportional to the control winding current may be obtained from the armature current of the machine 79 and as illustrated is derived from the resistor 90 in the armature circuit of machine 79. The left-hand terminal of field winding 84 is connected to one terminal of resistor 101a through a contact rectifier 102 which is poled in a direction to pass current in the direction of the arrow when the variable component of voltage from resistor 90 is greater than the reference voltage. The current limit circuit may now be traced from positive terminal of resistor 90, through the resistor 101a, through rectifier 102 to the left-hand terminal of field winding 84, through field winding 84 to the negative terminal of resistor 90. The rectifier 102 renders the circuit unidirectional so that there is no current traversing the current limit field 84 until the component of voltage from resistor 90 exceeds the reference component of voltage from resistor 101a. However, with the assumed polarities it will be noted that when the armature current of machine 79 raises the positive potential of resistor 90 above that of the reference potential, field winding 84 is energized from left to right which makes the positive brush 82 less positive and therefore limits the armature current.

When the current in the armature of the control generator 79 is in the reverse direction, the voltage component across resistor 90 is in the reverse direction from that assumed above and it is then necessary to select a reference voltage which is also reversed from that previously assumed in order to have the two components opposed. Hence, the resistor 101 is connected in series with the component of voltage across resistor 90 through a contact rectifier 102a. In this case, the current limit circuit may be traced from the left-hand terminal of resistor 90 (now plus), through field winding 84, through rectifier 102a, through resistor 101 back to the right-hand terminal of resistor 90 (now negative). The rectifier 102a renders this circuit unidirectional so that there is no current traversing the current limit field 84 until the component of voltage from resistor 90 exceeds the reference component of voltage from resistor 101. It will be observed that the right-hand terminal of field winding 84 is indicated as positive for the first conditions assumed but under the last assumed reversal of armature polarity of the machine 79 its right-hand brush 82 is now positive and hence a positive potential on the right-hand terminal of field winding 84 tends to make the brush less positive and thereby limit or reduce the armature current in the reversed direction.

Since consideration of the load transfer field 85 involves a number of devices at the opposite end of the system and illustrated in Fig. 2, such consideration will be deferred until later and the excitation and control of the load control field 86 will now be considered. In principle, when the tube groups 3 and 4 are operated as rectifiers the machine 79, through the phase shift circuit 26, operates as a regulator balancing the load current of the conversion apparatus against a reference voltage or signal. A measure of the load current of the converter is secured by rectifying the output of current transformers connected in the input circuit 1 to the rectifier. Thus on the previously stated assumption the apparatus of Fig. 1 will be considered as the 60 cycle rectifier end and that of Fig. 2 as the output or 25 cycle inverter end, a component of voltage proportional to the load current is derived from current transformers 103 associated with circuit 1. The output of current transformers 103 is converted through transformer 104 to an A.-C. voltage component and this voltage component is transferred through a group of conductors 105 to a suitable rectifier 106. A resistor 107 is connected across the rectifier 106 and is provided with an adjustable tap 108 to provide a convenient adjustable voltage component corresponding to the load current of the converter. This component of voltage may thus be referred to as the load voltage $E_L$. This component of voltage corresponding to rectifier load current is arranged to oppose a reference component of voltage which may be referred to as $E_R$. The reference voltage $E_R$ may be obtained from a suitable adjustable source of constant voltage which remains substantially constant at the adjusted level. In practice, I have found that a three-phase induction regulator 109 having its shunt and series windings connected in a manner to provide a three-phase voltage of adjustable magnitude makes a satisfactory reference voltage. The induction regulator as illustrated is connected to be energized from the bus 27A. The output circuit of the device 109 is connected to a transformer 110 which is provided with a primary winding 111 and in order to provide a reference voltage for both ends of the system, two secondary windings 112 and 113, respectively, are also provided. The output voltage of the secondary winding 112 is connected to a suitable rectifier 114 for use at the 60 cycle end of the system (Fig. 1) and the secondary winding 113 is connected through a group of conductors 115 to a suitable rectifier 114' for use at the 25 cycle end of the system (Fig. 2). A pair of resistors 116 and 117 are connected in series across the output of the rectifier 114 and are provided with adjustable taps 118 and 119, respectively, to make available the adjustable reference component of voltage E_R. The adjustable contacts 108 of the E_L resistor and 119 of the E_R resistor are connected together and provided with a connection terminal 120 which is connected through an I switch 121 to the left-hand terminal of field winding 86. The lower terminal of resistor 107 is connected through an R switch 122 to the left-hand terminal of winding 86. The adjustable contact 118 of the E_R resistor is connected through an R switch 123 to the right-hand terminal of winding 86. The energization of winding 86 during rectifier operation of the tube groups 3 and 4 will now be evident. It will be noted that the reference voltage component E_R and the load current voltage component E_L are connected in series opposition across the field winding 86. With the R switches 122 and 123 closed the circuit may be traced from contact 118, the positive terminal of the reference voltage E_R, through R switch 123, through winding 86 from right to left, through R switch 122, through load current resistor 107, back to the negative terminal 119 of the reference voltage resistor 117. The difference between the reference voltage E_R and the load voltage E_L will act on the control field 86. If the load is lower than is desired, the reference voltage E_R will exceed the load voltage E_L and will excite the field winding 86 from right to left in a direction to change the saturating current of control saturating windings 73 to 78 in a direction to advance the rectifier grids and thereby increase the load to the value set by the reference voltage E_R. On the other hand, if the load be greater than is required as determined by the reference voltage E_R, the reverse action will take place and the rectifier grids will be retarded.

The induction regulator 109 may be operated in response to several methods of regulating the load such as manual control, watt control or demand watt control. The various novel features involved in these several controls for regulator 109 are described and claimed in an application of Gittings and Bateman, Serial No. 560,161, filed October 24, 1944, now Patent No. 2,407,072 of September 3, 1946, and assigned to the assignee of the present application. For purposes of simplicity, I have shown a manual control which includes, as a suitable driving means for the rotatable element of the device 109, a reversible motor 124 connected through a suitable shaft and gearing 125 to the rotatable element of the induction regulator. As a means for controlling the direction and amount of rotation of the motor 124 I have shown a reversing switch 126 connected between the motor 124 and a source of voltage 127 indicated by the + and − signs.

The field winding 86 is controlled in accordance with the same reference voltage E_R when the tube groups 3 and 4 are operated as inverters, although other variable components of voltage are related to E_R. The same reference voltage E_R across the contacts 118—119 of resistors 116 and 117 may be used as illustrated. This reference voltage is connected in series relation with three other voltage components particularly pertinent to inverter operation across the field winding 86. One of the three components is a voltage component E_p derived from the resistor 90 or a portion thereof as illustrated which is proportional to the armature current of the machine 79. Another component which may be referred to as inverter bias is derived from the voltage of the bus 1 through the bus 27a, to adjust the initial advance of the inverter grids. A suitable rectifier 128 is connected to the bus 27a and a resistor 129 is connected thereacross and provides a convenient source of D. C. voltage corresponding to the output voltage of the inverter tube groups 3 and 4 when these tubes are operating as inverters. This component of voltage may be used in an additive direction, as illustrated, to the reference voltage E_R. Still another component of voltage is derived from the bus 27a through a negative phase sequence network device 130, the output of which is rectified by a suitable rectifier 131 having a resistor 132 connected thereacross. The component of voltage from resistor 132 is in the same direction as the reference voltage E_R and is utilized to modify the control in the event of phase unbalance in the inverter output circuit. The lower terminal of resistor 132 is connected to the contact 118 on the reference voltage resistor through an I switch 133. The energizing circuit for winding 86 during inverter operation will now be evident. Starting with the left-hand terminal of winding 86, the circuit may be traced through I switch 121, reference resistors 116—117, I switch 133, negative phase sequence resistor 132, inverter bias resistor 129, armature current resistor 90 and to the right-hand terminal of winding 86. With this circuit just traced, if the reference voltage is higher than the resultant of the other three components of voltage, more load is being indicated and the winding 86 will be energized in a direction from right to left under the assumed polarities and make the left-hand brush 82 more positive to cause the phase shift circuit to advance the inverter grids. In this way the inverter grids are advanced to maintain an approximately constant margin angle or deionization angle the importance of which was explained above.

The final feature of field control to be considered is that involving the energization of winding 85 which is herein referred to as load transfer control. However, since winding 85 is dependent for its energization upon the apparatus shown in Fig. 2, a brief description of that figure now will aid in a consideration of the load transfer control. Since the various elements and devices at the two ends of the system are substantially identical, except for design changes that may be necessitated by two different frequencies, all the elements and devices of Fig. 2, which has been assumed to be at the 25 cycle end, have been given the same reference numerals, with a prime mark, as the corresponding elements and devices of Fig. 1. The only exception to this system of identification is that part of the main power circuit which has been previously described.

The mechanism and system of load transfer involving the energization of field winding 85 of generator 19 may now be considered when the previously considered tube groups 3 and 4 and thus the 60 cycle end is being operated as an inverter with power flow from circuit 2 to circuit 1. The principle employed in the transfer is to derive a voltage component from the armature current of the phase shift control generator 79' at the now assumed rectifier end (Fig. 2), and balance this component of voltage against a reference component of voltage so that field winding 85 of generator 79 (now at the inverter end) is energized when the component of voltage corresponding to the armature current of the control generator at the rectifier end exceeds the reference voltage. The reference voltage may conveniently be obtained from the resistor 101'a which is connected in circuit with the output of the presaturating current rectifier 73'p. A component of voltage, which is variable in accordance with the armature current of the control generator 79' is obtained from the resistor 90' which is connected in series with the load brushes 82'. These two components of voltage are connected in a circuit with opposed polarities through a conductor 134' which interconnects the positive terminal of the reference-voltage resistor 101'a and the positive terminal of the armature-current resistor 90'. A conductor 135' is connected to the negative polarity tap 101'b on resistor 101'a through an adjustable resistor 136', a contact rectifier 137', one side of the circuit may be traced to the right-hand terminal of winding 85 of machine 79 (Fig. 1) by way of conductor 135'. A conductor 139' is connected to the negative terminal of resistor 90' and may be traced to the left-hand terminal of winding 85 (Fig. 1). Hence, these two components of voltage from resistor 90' and resistor 101'a are connected in series opposition and transferred from Fig. 2 to winding 85 on Fig. 1 by conductors 135' and 139'. These components of voltage are so related relative to the direction of conductivity of the rectifier 137' that winding 85 is not energized so long as the reference voltage from 101'a is higher than the reference voltage from resistor 90'. However, when the current of the now assumed rectifier control generator 79' exceeds a predetermined value, the positive component of voltage from armature current resistor 90' is enabled to send current in the conducting direction of rectifier 137' so as to send a current through winding 85 from right to left and cause the control generator 79 to advance the phase of the network 26 which advances the inverter grids and thereby transfers load control to the inverter end of the system.

Load transfer is effected from the control generator 79 of Fig. 1 when it is operating as a rectifier to the control generator 79' when its associated apparatus is functioning for inverter control in the same manner as has been described above. In this case, the various corresponding elements and devices diagrammatically illustrated in Fig. 1, which are instrumental in effecting load transfer control to winding 85' of control generator 79' of Fig. 2, are identified by unprimed numerals.

Each tube of the several tube groups is furnished with an appropriate excitation circuit. For the ignitor type of tube with a control grid to determine the instant of conduction in each tube both an ignitor energizing circuit 140 and a grid energizing circuit 141 are arranged for each pair of tubes which are to be conductive 180 degrees apart. For the purpose of simplifying the drawing, only one of each of the respective excitation circuits is shown in diagrammatic detail, although it is to be understood that ignitor and grid excitation circuits similar to those illustrated will be connected, as will be understood by those skilled in the art, to the respective pairs of valves and to the proper points on the phase shift network 26 and 26' with due regard to the phase of the anode voltages of the particular pair of tubes to be controlled. A suitable arc initiating circuit for tubes of the ignitor type, as illustrated, may be of the so-called magnetic impulse type such as is described and claimed in an application S. N. 413,232 of A. H. Mittag, filed October 1, 1941, now Patent No. 2,362,294 of November 7, 1944, and assigned to the assignee of this application. This type of ignitor circuit is very diagrammatically indicated in Fig. 1 and comprises, as part of its principal components, a firing capacitor 142 and a firing reactor 143 which is designed to saturate during each half wave of alternating voltage of the circuit 140 by reason of the discharge of current from the firing capacitor 142 through the primary winding 145 of transformer 14. The firing circuit may also include a linear reactor 146 connected between the circuit 140 and the firing capacitor 142 to prevent discharge of the capacitance to the supply circuit 140 and also to limit the current taken from the supply circuit at the time the capacitance discharges through winding 145. The transformer 144 may be an insulating transformer, as illustrated, which is provided with a pair of secondary windings 147 and 148 and is utilized to transform the ignitor peaks up to the high voltage level of the tubes. Hence, one terminal of the secondary winding 147 is connected to the ignitor electrode 23 of the upper righthand tube in tube group 4 through a contact rectifier 149, and the other terminal is connected to the cathode 22 of this same tube. The ignitor of the opposed tube of this tube pair would be connected to winding 148 in a similar manner. It is to be understood that the firing peaks of firing reactor 143 occur on both the positive and negative half cycles of the source voltage and thus the single firing reactor 143 provides two peaks displaced 180 degrees apart so as to serve for firing two opposed tubes.

A suitable grid firing circuit is described and claimed in my application Serial No. 539,941, filed June 12, 1944, now Patent No. 2,419,465 of April 22, 1947, and assigned to the assignee of the present application. Hence, in the system illustrated I have shown the grid excitation circuit quite diagrammatically but in sufficient detail to incorporate the essential features thereof. I again illustrate an insulating transformer 150 comprising a primary winding 151 which is connected to the grid supply circuit 141 and a pair of secondary windings 152 and 153. One terminal of the secondary winding 152 is connected to the cathode of the upper right-hand tube of tube group 4. The secondary winding 152 supplies a potential to the holding anode circuit 24 through a transformer 154 and to the grid 25 preferably through a peaking transformer 155. A suitable bias means, indicated by the battery 156, is connected in the grid circuit to hold the tube off or specifically to hold the grid negative until the positive peaker voltage overcomes the bias and renders the tube conducting. The secondary winding 153 would be connected to the grid and holding anode circuits of the oppositely disposed tube of the two tube groups of tube group 4 in a manner understood by those skilled in the art.

In connecting the ignitor circuit 140 and the grid circuit 141 to the phase shifter 26, it is necessary to determine the phase of the anode voltage of the particular pair of tubes under consideration and the relation between the several voltages of the respective electrodes of the tube. For the pair of tubes of tube group 4 illustrated, with the ignitor and grid circuits illustrated in diagrammatic detail, it will be assumed that the anode voltage has the phase position indicated by the arrow marked "anode" in the center of phase shift circuit 26. If the firing circuit voltage for the ignitor goes through zero at a given angle displaced from zero anode voltage, which we may assume for purposes of illustration is of the order of 140 degrees advance for the three-phase full wave connection illustrated, the firing reactor would cause the ignitor to fire at a point of the order of 30 degrees after the zero phase of anode voltage. Hence, the ignitor firing circuit 140 would be connected to taps on phase shifter 26 such that a line through the taps will be substantially parallel to a line advanced of the order of 140 degrees relative to the phase of the anode voltage shown. In the drawings, the tap connections indicated for the assumptions made are taps 50a and 59a.

If the grid peaker 155 is arranged to fire at the 65° point of the voltage impressed thereon, this means that the grid voltage goes through zero some 35° ahead of the zero phase of the anode voltage and the grid circuit 141 is connected to taps 56a and 58a on the polygon windings 37 to 48 such that a line therethrough is advanced substantially 35° ahead of the assumed phase of the anode voltage. The arrangement and connection of the ignitor circuit 140' and the grid circuits 141' of the tube groups 5 and 6 are made to phase shift network 26' in a similar manner to that described in connection with phase shift network 26.

The general operation of the illustrated embodiment of my invention may now be considered briefly. It was considered expedient to describe briefly the operation of the various component parts and elements in connection with the initial consideration of these elements so that the general overall operation may be more easily understood.

In the illustrated embodiment of the invention above described the system rectifies alternating current from the supply end, such as circuit 1, by the tube groups 3 and 4 to direct current which traverses the direct loop comprising conductors 3a to 4b to the inverter tube groups 5 and 6 where conversion is effected to alternating current which is supplied to circuit 2. The direction of power flow is determined by the phase angle of grid excitation. Thus, if it is desired to transmit power from circuit 1 to circuit 2, all R switches associated with the apparatus of circuit 1 will be closed while all I switches at this rectifier end will be opened. Conversely, all I switches associated with the apparatus of circuit 2 at the inverter end will be closed while all R switches will be opened. With the amplidyne generators 79 and 79' operating, the induction regulator 109 will be adjusted to set the reference voltage $E_R$ at such a value as to effect substantial equality between the rectifier voltage and the inverter counter voltage, so that no power is interchanged over the D.-C. loop. For this condition the amplidyne generator 79 will supply current to the phase shifter control windings 73 to 78 so that the rectifier grids are fully retarded as explained above and the inverter grids of the tube groups 5 and 6 are advanced by phase shifter 26' the minimum desired amount for a proper commutation angle as determined by the inverter bias resistor 73'. Power transfer from circuit 1 to circuit 2 is then increased by adjusting the induction regulator 109 at some predetermined setting corresponding to the desired load. The amplidyne generator 79 through the action of the control field winding 86 will then decrease the energization of the phase shift control windings 73 to 78 from full excitation in one direction which provides the 90 degree phase retard through zero to full excitation in the opposite direction for full grid advance or such excitation as will provide the necessary phase shift corresponding to the load setting previously set by regulator 109. If it be assumed that the load setting required full phase advance of the rectifier grids and the desired load was not yet attained, the load transfer mechanism would immediately function in response to a predetermined armature current of the amplidyne generator 79. If this armature current limit is exceeded, the voltage component derived from resistor 90, which is proportional to the armature current of amplidyne 79, would cause energization of field winding 85' of the amplidyne 79' at the inverter end and cause the voltage of this amplidyne to change in such a direction as to change the saturation of control windings 73' to 78' of phase shifter 26' to change in such a direction as to effect a greater phase advance of the grids of the inverter tube groups 5 and 6. The advance of phase of the inverter tube groups reduces the counter E. M. F. of these tube groups and thus transfers load control to the inverter end. As a result, it has been found that increasing the inverter load angle, while holding the rectifier grids fixed, results in a larger load with an approximately constant margin angle. A similar sequence of operations would be effected if power transfer were in the reverse direction, namely from circuit 2 to circuit 1.

Now while the tube groups 3 and 4 were assumed to be operating as rectifiers, I also previously stated that the tube groups 5 and 6 were assumed to be operating as inverters with the I switches closed and the R switches open. Under inverter operation, the ignitor and grid circuits of these tubes are initially adjusted for the proper advanced phase shift for inverter operation. The phase adjuster 26', with the I switches closed, has a phase range of the order of 60 degrees. Aside from the feature of load transfer control effected through winding 85' the inverter tubes through the phase shifter 26' are responsive to four components of voltage, namely the reference voltage $E'_R$ from adjustable contacts 118—119, a component of voltage dependent upon inverter unbalance and, hence, derived from the negative phase sequence network 130', a component of voltage dependent upon the voltage of the circuit 2 derived from inverter bias resistor 129' and a component of voltage dependent upon the armature current of the amplidyne generator 79' derived from resistor 90'. One important feature of the control on the inverter grids is the relation between the amplidyne armature current and the reference voltage. When the reference voltage $E'_R$, which is also the reference voltage of the rectifier end, calls for a larger load, the control winding 86' is energized with a different current which acts through the phase shift control windings 73' to 78' to advance the inverter grids. In this way, the inverter grids are advanced to maintain an approximately constant margin angle or deionization angle. The two additional components of voltage provide correction for the inverter bias and phase unbalance in the inverter, if necessary, through modification of the excitation of winding 86' and hence result in a phase shift of the inverter grids to effect the desired correction. The tube groups 3 and 4, when operating as an inverter, operate in substantially the same manner as has been described for tube groups 5 and 6. Load transfer control from the tube groups 5 and 6 operating as rectifiers to tube groups 3 and 4 operating as inverters is effected through armature current resistor 90' and the load transfer circuit comprising conductors 135' to 139' to the load transfer field winding 85 of amplidyne generator 79.

While I have shown and described a particular embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dynamo-electric machine having an armature winding, a first control field winding, a second control field winding, means for energizing said first control field winding in a direction to effect an increase in the armature current above a predetermined value, means for producing a reference component of voltage, means for producing a component of voltage proportional to current in said armature winding, and means including a unidirectional conducting device for connecting said components of voltage in opposed relation responsive to the current of said armature winding for energizing said second control field winding only when said armature current exceeds said predetermined value and in a direction to limit the current of said armature winding to said predetermined value.

2. In combination, a dynamo-electric machine having an armature winding, a first control field winding, a second control field winding connected upon energization to oppose the magnetization of said first control field winding, means for energizing said first control field winding in a direction to effect an increase in the armature current above a predetermined value, means for producing a component of voltage of constant value, means for deriving a component of voltage variable in accordance with the armature winding current, means for connecting said components of voltage in opposed series relation to energize said second control field winding, and a unidirectional conducting device conected in series relation with said second control winding and being poled to conduct current only when said variable component of voltage exceeds said component of voltage of constant value.

3. In combination, a dynamo-electric machine having an armature winding, a first control field winding, a second control field winding, means for energizing said first control field winding in a direction to effect an increase in the armature current above a predetermined value, means including a resistor connected in series relation with said armature winding for deriving a component of voltage variable in accordance with said armature current, means for deriving a constant component of voltage, means for connecting said components of voltage in opposed relation to energize said second control field winding, and unidirectional conducting means connected in series relation with said second control field winding for selectively causing energization thereof to limit said armature current when said first mentioned component of voltage exceeds said constant component of voltage.

4. In combination, a reversible polarity amplidyne generator having an armature winding, a control field winding for said armature winding, a second field winding for said armature winding and being provided with end terminals, means for energizing said control field winding in a direction to effect an increase in the armature current above a predetermined value, means including a first resistor connected in series relation with said armature winding for deriving a component of voltage variable in accordance with said armature current, means including a pair of series connected resistors having an intermediate junction terminal and a pair of end terminals, means for energizing said pair of resistors for providing equal and constant components of voltage across the respective resistors of said last mentioned series connected resistors, a closed circuit including a pair of opposed unidirectional conducting devices having a junction terminal therebetween and being connected in series relation to the end terminals of said resistors, said second field winding being connected between the junction terminal of said unidirectional conducting devices and an end terminal of said first resistor, the other end terminal of said first resistor being connected to the junction terminal between said series connected resistors whereby said second field winding is selectively energized to limit said armature current for either polarity of voltage of said generator when the component of voltage across said first resistor exceeds the constant component of voltage across either one of said series connected resistors.

BURNICE D. BEDFORD.

REFERENCES CITED

The following references are of record in the file of this patent:

UNITED STATES PATENTS

| Number | Name | Date |
|---|---|---|
| 2,134,880 | McDowell et al. | Nov. 1, 1938 |